United States Patent [19]

Howell

[11] 4,408,186
[45] Oct. 4, 1983

[54] POWER LINE COMMUNICATION OVER GROUND AND NEUTRAL CONDUCTORS OF PLURAL RESIDENTIAL BRANCH CIRCUITS

[75] Inventor: Edward K. Howell, Simsbury, Conn.

[73] Assignee: General Electric Co., New York, N.Y.

[21] Appl. No.: 231,632

[22] Filed: Feb. 4, 1981

[51] Int. Cl.³ .................................. H04M 11/04
[52] U.S. Cl. ......................... 340/310 A; 340/310 R; 340/310 CP; 340/538; 361/332
[58] Field of Search ........ 340/310 A, 310 CP, 310 R, 340/538; 361/332–334, 48, 113; 179/27 H, 2 R, 2.51, 82

[56] References Cited

U.S. PATENT DOCUMENTS

| | | | |
|---|---|---|---|
| 2,023,857 | 12/1935 | Satterlee et al. | 340/310 R |
| 3,287,722 | 11/1966 | Craig | 340/310 A |
| 3,702,460 | 11/1972 | Blose | 340/310 A |
| 3,810,096 | 5/1974 | Kabat et al. | 340/310 CP |
| 3,911,415 | 10/1975 | Whyte | 340/310 A |
| 4,075,675 | 2/1978 | Burkett et al. | 340/310 R |

Primary Examiner—Donnie L. Crosland
Attorney, Agent, or Firm—Richard A. Menelly; Walter C. Bernkopf; Fred Jacob

[57] ABSTRACT

Power line communication over plural residential branch circuits is accommodated by creating a signal coupling inductive impedance in a tie conductor electrically interconnecting the grounded neutral bus, to which the branch circuit neutral conductors are commonly terminated, and a ground bus commonly terminating the branch circuit ground conductors, such as to support voltage signals propagating on the ground conductors with respect to the neutral conductors of the branch circuits. This inductive impedance is created either by a signal coupling transformer linked with the tie conductor and driven by a signal transmitter, with signal receivers capacitively coupled across the branch circuit neutral and ground conductors, or is of a passive nature, with both transmitters and receivers capacitively coupled across the branch circuit ground and neutral conductors.

15 Claims, 2 Drawing Figures

POWER LINE COMMUNICATION OVER GROUND AND NEUTRAL CONDUCTORS OF PLURAL RESIDENTIAL BRANCH CIRCUITS

BACKGROUND OF THE INVENTION

The present invention relates to power line communication (PLC) systems and particularly to a PLC system for communicating over existing residential wiring.

Numerous attempts to communicate over electrical power distribution conductors have been made in the past. The most successful of these have been those communication systems utilizing conductors of power distribution networks which can be readily tailored to accommodate successful communication, such as electric railway and primary power distribution networks. However, attempts to communicate over the power lines within a building have not generally been successful. The most significant problem encountered is noise. Since prior art approaches to communicating over residential branch circuits have traditionally utilized the line and neutral conductors as the communication links, noise generated by connected loads poses a significant obstacle to successful communication. The most common source of noise in residential power circuits are current switching devices which can be either of the mechanical or solid-state variety. Typically such noise is basically of a transient nature, but may be generated repetitively, as in the case of series motors and lamp dimmers. Noise can appear as voltages between line and neutral conductors, as well as currents flowing therethrough. Voltage magnitudes are typically in the range of 100 to 300 volts with frequency components ranging from 60 Hertz to hundreds of megaHertz. The internal reactance of the utilities' distribution transformer feeding the residential power circuits results in a transient disturbance of the line voltage with each switch opening and closing having frequency components within a typical PLC signal frequency band. In the case of a solid-state lamp dimmer, this disturbance may exceed 100 volts on each half-cycle of the 60 Hertz voltage wave. The large amplitude, fast rise-time (relative to PLC signal frequency), and repetitive nature of lamp dimmer noise are particularly troublesome to successful communication.

Furthermore, mechanical switches, such as timers, thermostats and motor brushes, transiently become sparkgap relaxation oscillators typically producing 300 volt disturbances at repetition rates within the PLC signal band and having frequency components extending to several hundred megaHertz. Such noise may be isolated bursts lasting a few milliseconds to repetitive trains, as in the case of series motors. The large amplitudes and wide range of frequencies of these noise disturbances pose a real challenge to receiver design.

Compounding the noise problem, PLC signal strength can vary widely throughout the building, especially between the two legs of the 120/240 volt electrical service, and is heavily dependent on the loads connected into the branch circuits. In general, inductive loads such as motors present a relatively high impedance to PLC signals. Resistive loads may vary widely from, for example, 144 ohms for a 100 Watt incandescent lamp to 12 ohms for a 1200 Watt toaster. The presence of a significant shunt capacitance in residential loads has not been prevalent in the past but is likely to increase. A load having a 0.1 microfarad capacitor imposes a 10 ohm shunt to PLC signals at a frequency of 160 kHz.

Increasing the transmitter's signal power to improve signal to noise ratio and provide successful signal reception throughout a building exacerbates the problem of PLC signals escaping the building via the line and neutral cables of the service entry drop. When these PLC signals reach the distribution transformer, they are blocked by the high internal transformer impedance. However, they can readily propagate along commonly connected service drops into other buildings fed thereby. It will be appreciated that what is signal to one PLC system is noise to all other PLC systems and the worst form of noise at that. Thus, PLC signals escaping one PLC system via a service drop and entering another PLC system via a commonly connected service drop poses especially serious noise problems for the latter system. Of course, signal traps may be utilized in the service entry drops to block such signal escape; however, to be effective, such traps are necessarily large and expensive.

Another problem in using the branch circuit line and neutral conductors to signal over is the necessity for some form of coupling impedance to enable communication between the two legs of the 120/240 volt electrical service installed in most buildings. Such coupling impedance is primarily provided by wiring capacitances and any 240 volt loads, such as ranges, water heaters, clothes dryers, etc. The internal impedance of the distribution transformer can rarely provide the requisite signal coupling impedance between the service legs. However, if a PLC system avails itself of this distribution transformer coupling impedance, its signals are available to invade other buildings as noise to any PLC system installed therein.

In the context of PLC systems for communicating between an electrical utility and its power-consuming customers for such purposes as remote meter reading, it has been proposed to utilize the distribution network neutral conductor and ground return as the communication link. This approach, exemplified in U.S. Pat. Nos. 3,702,460 and 4,016,429, is seen to avoid the impedance matching and signal attenuating problems posed by the continuously varying network loads connected between the phase or line conductors and neutral. Since a communication link utilizing the neutral conductor of a utilities' distribution network involves a multiplicity grounds, the neutral conductor being connected to ground at the service entry load center of each customer, the PLC systems described in these patents cannot be adapted to accommodate communication over branch circuits within a building inasmuch as the system neutral is necessarily grounded at only one point.

PLC systems have also been proposed for communicating over the branch circuits within a large building, such as a hotel, wherein PLC signals are coupled onto the neutral conductors with respect to ground, as evidenced by U.S. Pat. Nos. 2,743,434 and 3,810,096. The systems disclosed therein rely on the imposition of an inductive reactance of negligible impedance at the 60 Hertz power frequency between neutral and ground so as to provide, at the elevated PLC signal frequency, sufficient impedance separating the branch circuit neutral conductor terminations at the service entrance from ground potential to support an adequate signal voltage on the branch circuit neutral conductors with respect to ground. However, when this is done, the PLC signals can readily propagate out onto the neutral cable of the service drop and thence to the distribution transformer where they are coupled as noise onto other commonly connected service drop neutral cables. Since the PLC systems of these patents contemplate large buildings, this is probably not a problem as, in all likelihood, there are no other service drops commonly connected at the distribution transformer.

It is accordingly an object of the present invention to provide an improved power line communication system for signalling over residential branch circuits.

An additional object is to provide a power line communication system of the above character wherein signal integrity is relatively unaffected by branch circuit loads and any noise generated thereby.

A further object is to provide a power line communication system of the above character wherein signal strength can be made essentially uniform throughout the system of branch residential circuits.

Yet another object is to provide a power line communication system wherein the escape of signals out onto the service entry drop is effectively avoided.

Another object is to provide a power line communication system of the above character which is economically and conveniently adaptable to existing residential power circuits.

Other objects of the invention will in part be obvious and in part appear hereinafter.

SUMMARY OF THE INVENTION

In accordance with the present invention, there is provided a power line communication (PLC) system for signalling over the branch circuits of an AC power distribution system within a building, such as a residential dwelling. The communication link utilized is comprised of those branch circuits equipped with a separate ground conductor, in addition to line and neutral conductors. Since, in accordance with the present invention, only the branch circuit neutral and ground conductors are utilized for communication, the obstacles to successful communication posed by loads connected across the branch circuit line and neutral conductors are largely avoided. Virtually the only noise seen by the subject PLC system is the voltage drop along the neutral conductor created by the flow therethrough of load and noise currents, which drop is obviously quite small and can be ignored or readily compensated for.

Since code requirements call for the termination of the neutral cable in the service feed or drop to be solidly connected to a single grounding point, i.e., clamped to ground potential, at the service entry equipment or load center, with all of the branch circuit neutral and ground conductors terminated at the load center in common electrical connection with the grounded neutral cable, the present invention utilizes inductive means to develop, at the selected elevated PLC signal frequency, an impedance effectively separating the commonly terminated branch circuit ground conductors from ground potential imposed on the commonly terminated branch circuit neutral conductors. This largely inductive impedance accommodates the development of a satisfactory PLC signal voltage between the neutral and ground conductors for communicating over the branch circuits thereof. In my co-pending application entitled "Power Line Communication System Using the Neutral and Ground Conductors of a Residential Branch Circuit" S.N. 231,631 filed concurrently herewith, the inductive impedance is serially introduced into the conductor or conductors (ground conductor, neutral conductor or both line and neutral conductors) of a single branch circuit over which communication is to be had by way of a signal coupling transformer linked with the branch circuit conductor or conductors. In accordance with the present invention, the inductive impedance is serially introduced into a tie conductor electrically interconnecting the grounded neutral bus and the ground bus within a service entry load center so as to accommodate communication over a communication link consisting of all of those branch circuits whose neutral and ground conductors are respectively terminated at the neutral and ground buses.

In one embodiment of the invention, the inductive impedance is introduced by a signal coupling transformer having a core linked with the tie conductor. Specifically the core embraces the tie conductor such as to constitute a single-turn winding thereof. Wound on the signal coupling transformer core is another winding for electrical connection with either a signal transmitter or a signal receiver. At any desired downstream location or locations on the branch circuits of the communication link, capacitive signal couplers, exhibiting a high impedance at the power frequency and a relatively lower impedance at the PLC power frequency, connect one or more signal receivers and/or one or more signal transmitters across the neutral and ground conductors thereof. These capacitive couplers serve to maintain the neutral and ground conductors downstream from the load center effectively electrically isolated from each other at the power frequency, thus precluding the flow of any load current through the ground conductor.

In an alternative embodiment of the invention, the impedance introduced into the tie conductor is simply a passive inductive impedance serving to couple voltage signals among all of the branch circuits for communication between transmitters and receivers, as well as transceivers, capacitively coupled across their ground and neutral conductors. Preferably, the passive impedance is imposed by a parallel resonant circuit transformer coupled into the tie conductor. Thus, voltage signals developed across this impedance are coupled across the ground and neutral conductors of all of the branch circuits of the communication link.

As an important feature of the present invention, the branch circuit neutral conductors of the communication link are all firmly clamped to ground potential at all frequencies, including the PLC signal frequency, at the service entry load center, and the voltage signals appear on the common ground conductors with respect to this ground potential of the neutral conductors. Thus, no voltage signal can appear on the neutral bus to propagate out of the building on the service entry neutral cable. Moreover, except for stray capacitance, there is no effective signal coupling impedance between the ground conductors and line conductors of the communication link branch circuits, and thus there is not appreciable PLC signal escape via the service entry mains.

The invention accordingly comprises the features of construction, combinations of elements and arrangements of parts which will be exemplified in the constructions hereinafter set forth, and the scope of the invention will be indicated in the claims.

For a better understanding of the nature and objects of the invention, reference should be had to the following detailed description taken in conjunction with the accompanying drawings in which:

DESCRIPTION OF THE DRAWINGS

Corresponding reference numerals refer to like parts throughout the several figures of the drawings.

DETAILED DESCRIPTION

Figure 1:
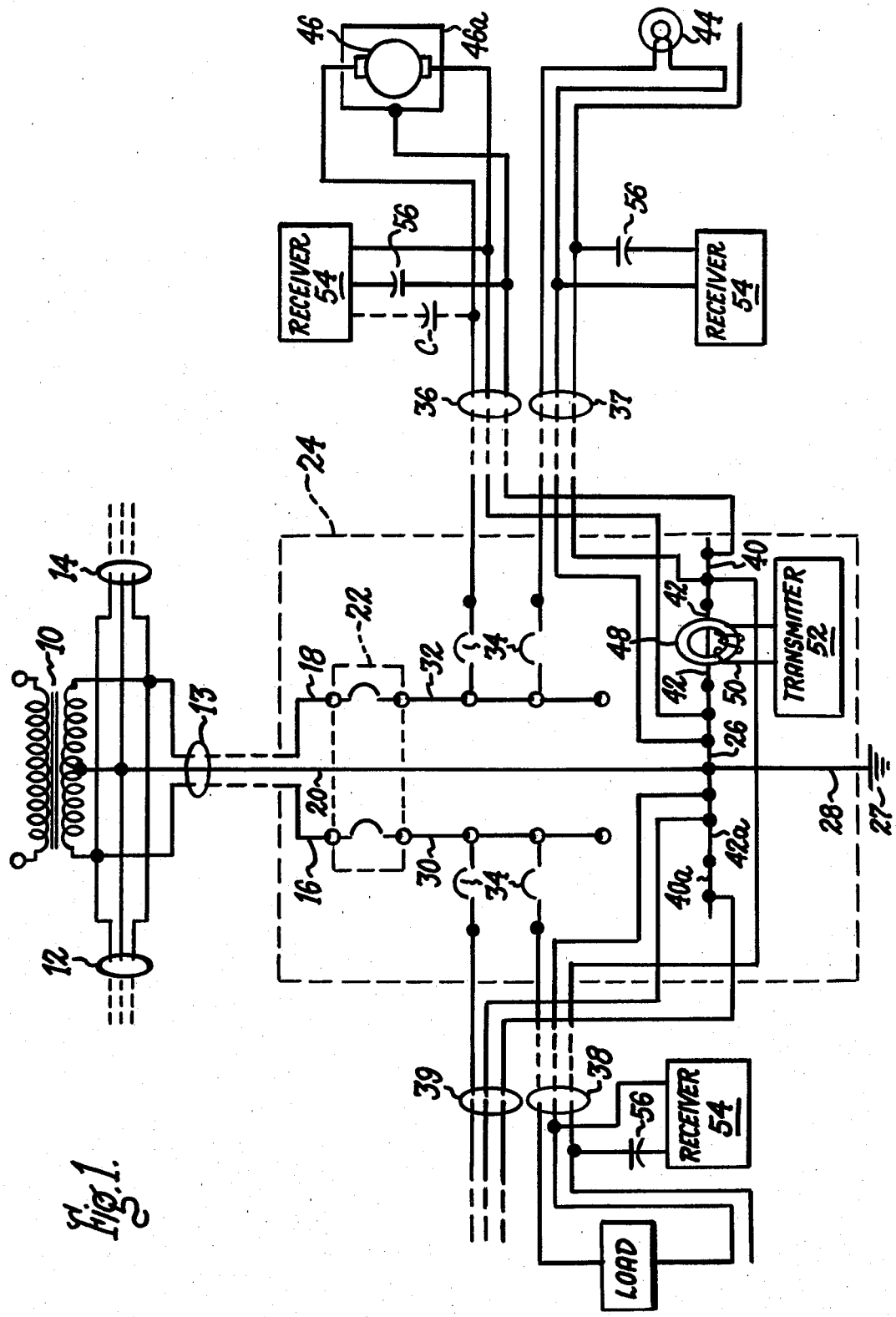
FIG. 1 is a circuit schematic diagram, partially in block diagram form, of a residential power line communication system constructed in accordance with one embodiment of my invention.

Referring to FIG. 1, a distribution transformer 10 is illustrated with its secondary center tapped to provide conventional 120/240 volt residential electrical service. Commonly connected with this transformer secondary are a plurality of service entry feeds or service drops running to the various buildings being served. Three such service drops are depicted at 12, 13 and 14. Each drop is a three-wire, single phase service consisting of a pair of mains plus a neutral cable. As seen in the case of service drop 13, mains 16 and 18 are separately electrically terminated at main circuit protective devices, such as the line terminals of a two-pole main circuit breaker 22 included in the customer's service entrance equipment, such as a load center 24. Neutral cable 20 of this service drop is electrically terminated in the load center at a neutral bus 26 which, in turn, is solidly connected to a convenient external grounding point 27, such as a water pipe, by a grounding wire 28. The load terminals of main circuit breaker are connected to a pair of main busbars 30 and 32 insulatively mounted within the load center enclosure. The various 120 volt branch circuits served by the load center have their line conductors separately connected via individual branch circuit protective devices, such as branch circuit breakers 34, to one or the other of the main busbars and their neutral conductors commonly connected to neutral bus 26. Those branch circuits fed from main busbar 32, such as those indicated at 36 and 37, can be considered as constituting one leg of the single phase, three-wire service, and those branch circuits, such as 38 and 39, fed from main busbar 30 constituting the other leg thereof. While not illustrated, it will be appreciated that a 240 volt branch circuit is fed from both main busbars via a two-pole circuit breaker.

For many years now residential branch circuit wiring has included a ground conductor in addition to load current carrying line and neutral conductors. These branch circuit ground conductors have been commonly terminated at neutral bus 26 within the load center, however modern wiring practice calls for these ground conductors to be terminated at one or more separate, ground buses provided in the load center, one being indicated at 40. This ground bus has then been electrically connected in common with the grounded neutral bus 26 through the metallic load center enclosure, but for purposes of the present invention, interconnection is made by a discreet tie conductor 42. For purposes of illustration, the ground conductors of branch circuits 36, 37 and 38 are terminated at ground bus 40, while the ground conductor of branch circuit 39 is terminated at a separate ground bus 40a connected in common with neutral bus 26 via the metallic load center enclosure or a tie conductor 42a.

Still referring to FIG. 1 the PLC system embodiment of my invention illustrated therein will be seen to utilize branch circuits 36, 37 and 38 as its communication link. The line and neutral conductors of these branch circuits serve to deliver load current to power various loads connected in parallel thereacross, such as incandescent lights 44 in the case of branch circuit 37 and an appliance motor 46 in the case of branch circuit 36. It is understood that the ground conductors run coextensively with their branch circuit line and neutral conductors. For example, the ground conductor of branch circuit 36 is shown connected to ground the appliance housing 46a. To couple signals onto this communication link, there is provided a signal coupling transformer including a small core 48 disposed in embracing relation with tie conductor 42 in load center 24. Wound on this core is a multi-turn primary winding 50 which is connected to a transmitter 52 of PLC signals having a frequency of, for example, 160 kHz. The portion of tie conductor 42 linked by the core constitutes a single-turn secondary winding in which is imposed an inductive impedance which is negligible at the 60 Hz power frequency, but at the elevated PLC signal frequency is of a sufficient magnitude to effectively separate all of the branch circuit ground conductors terminated at ground bus 40 from ground potential to which the branch circuit neutral conductors are effectively clamped at neutral bus 26. Transmitter 52, in driving primary winding 50, develops a signal voltage across this secondary winding impedance, which signal voltage appears on the ground conductors of branch circuits 36, 37 and 38 and is with respect to the ground potential of the neutral conductors thereof. Note that no signal voltage appears on the ground conductor of branch circuit 39 since it is terminated at ground bus 40a and clamped to the ground potential of neutral bus 26 via tie conductor 42a. Thus branch circuit 39 is not therefore included in the communication link.

To receive these voltage signals, receivers 54 are connected across the ground and neutral conductors of branch circuits 36, 37 and 38 via capacitive signal couplers including capacitors 56. These couplers exhibit a high impedance of many thousand ohms at the power frequency and a relatively low impedance of, for example, 10 ohms at the signal frequency. Preferably, the receivers should have a high internal impedance so as to maintain the signal voltage at acceptable levels throughout the communication link. As illustrated for branch circuit 36, the receivers may also be connected to the line conductors via a coupling capacitor indicated in phantom at C in order to provide the capability of cancelling noise voltages seen by the receivers resulting from noise current flowing through the wire impedance of the neutral conductors. Such noise voltages will also appear on the line conductor in equal magnitudes but of opposite polarity.

It will be observed that the terminations of the neutral conductors in the load center are effectively clamped to ground potential at the signal frequency, and therefore no signal voltage can appear on neutral bus 26 for propagation out onto neutral cable 20 of the service drop 13. Moreover, except for stray capacitance coupling, there is no effective signal coupling impedance between the ground conductors of the communication link and their associated line conductors, and thus no appreciable PLC voltage signals can be coupled onto the line conductors and thence propagate out onto service drop mains 16 and 18. Thus the present invention inherently traps with relative effectiveness the PLC voltage signals within the particular residential power distribution system in which the PLC system is installed, thereby eliminating the need for separate, relatively expensive signal traps. In fact, it is seen that the PLC voltage signals are effectively confined exclusively to the illustrated ccommunication link, i.e., branch circuits 36, 37 and 38.

It will be further appreciated that the positions of the transmitter and receivers shown in FIG. 1 may be changed, such that both transmitters and receivers are capacitively coupled across the neutral and ground conductors of the branch circuits, while either a transmitter or a receiver is inductively coupled onto tie conductor 42 via the signal coupling transformer. Moreover, it will readily occur to those skilled in the art that the transmitter and receivers of FIG. 1 may each be transceivers for two-way communication over the communication link of branch circuits 36, 37 and 38.

Figure 2:
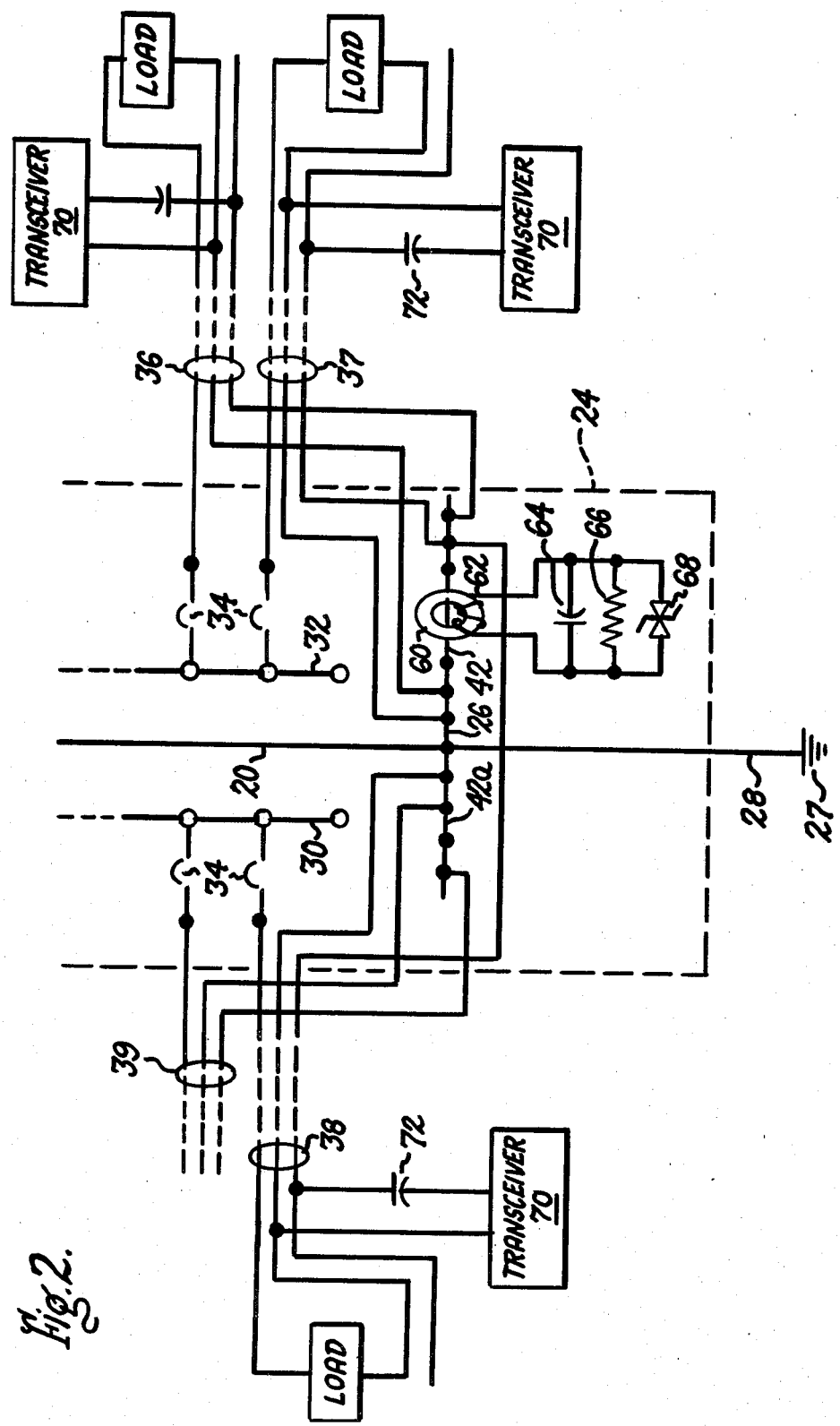
FIG. 2 is an abbreviated circuit schematic diagram, partially in block diagram form, of a residential PLC system constructed in accordance with an alternative embodiment of my invention.

In the embodiment of my invention seen in FIG. 2, it is shown that the signal coupling inductive impedance introduced in tie conductor 42 can be a passive impedance to accommodate the transmission of PLC voltage signals between the branch circuits of the communication link. In its simplest form, this passive impedance may be provided by a magnetic core 60 linked with tie conductor 42. Most conveniently, the tie conductor is simply embraced by the core to constitute a single-turn winding thereof. The size, shape and permeability of this core would be selected to create an inductance of 50 to 100 micro-Henrys in this one-turn winding. This represents a negligible impedance at the power frequency, but at the PLC signal frequency of 160 kHz constitutes an impedance of 50 to 100 ohms, quite adequate for coupling voltage signals between the branch circuits 36, 37 and 38. However, this impedance increases with frequency and thus would be an effective coupler of any high frequency noise. Therefore, it is preferable to utilize a parallel-resonant impedance of moderate Q to provide the requisite high impedance at the PLC signal frequency and a low impedance at all other frequencies.

To this end, core 60 is wound with a multi-turn winding 62, and a capacitor 64 is connected thereacross of a value to resonate with the winding inductance at the PLC signal frequency. A resistor 66 is connected across the capacitor to provide an acceptably high Q. By virtue of this resonate coupler arrangement, a coupling impedance of 50 ohms at a signal frequency of 160 kHz can be imposed in tie conductor 42, which coupling impedance falls off at frequencies above and below the signal frequency. Since a resonant circuit is subject to shock excitation, it can produce a ringing noise. It may be desirable to restrict this effect, and to this end a voltage clamping element, such as back-to-back Zener diodes 68, is connected across the resonant circuit.

The physical size of this passive resonant signal coupler can be made quite small, on the order of one cubic inch, and can be of low cost since both current and voltage stress is low. It can be conveniently added to existing service entry load centers or built into new ones. Since this signal coupler is passive, no additional wiring in the load center is needed. To communicate over the branch circuits 36, 37 and 38 of the communication link of FIG. 2, signal transmitters and receivers 70, which may also be transceivers, are coupled across the ground and neutral conductors at any locations on any one or all of these branch circuits, via capacitive signal couplers (capacitors 72). While not shown, a central transmitter, receiver or transceiver may be capacitively coupled across the neutral bus 26 and ground bus 40 or connected with secondary winding 62 of the resonant coupler. As in the embodiment of FIG. 1, no communication is had over branch circuit 39.

It will be readily appreciated by those skilled in the art that utilizing the branch circuit ground and neutral conductors of communication in accordance with the present invention accommodates reductions in the size and cost of the transmitters and receivers since they are not subjected to the continuous stress of line voltage and high transient voltages appearing between line and neutral. The same is true of the coupling capacitors which may have lower voltage ratings and enjoy greater life expectancy and reliability. Since the problems of noise are greatly mitigated, PLC signal magnitude can be reduced and still provide successful communication, thus further insuring against the escape of appreciable signal from the communication link. The inherent signal voltage uniformity throughout the communication link reduces receiver costs since the dynamic operating range is reduced. It will be appreciated that the PLC system of the present invention may be put to myriad purposes such as remote switching in and out or otherwise controlling branch circuit loads, fire and intrusion alarming, voice communication, and so on.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A power line communication system for signalling over a low voltage AC power distribution system for distributing electrical power at an AC power frequency throughout a building, wherein the power distribution system includes a load center and a plurality of branch circuits, the load center having at least one main busbar to which a main of a service entry feed is connected and a neutral bus to which a neutral cable of the service entry feed is connected, the neutral bus being solidly clamped to ground potential, each branch circuit having a line conductor electrically connected with the main busbar and a neutral conductor terminated in electrical connection with the neutral bus, said communication system comprising, in combination:

A. a ground bus included in the load center;
B. a tie conductor electrically connecting said ground and neutral buses in common;
C. a signal communication link consisting of at least one of the branch circuits, said one branch circuit including, in addition to a line conductor and a neutral conductor, a ground conductor terminated in electrical connection with said ground bus and otherwise electrically isolated from the neutral conductor thereof downstream from the load center;
D. a transmitter for transmitting voltage signals of a frequency greater than the power frequency and coupled onto said communication link;
E. a receiver tuned to said voltage signals and coupled onto said communication link; and F. inductive means associated with said tie conductor to introduce an impedance between said ground and neutral buses at the signal frequency such as to accomodate the propagation of voltage signals along said one branch circuit between said transmitter and receiver, said voltage signals being precluded from propagating onto the neutral cable of the service entry feed by virtue of the neutral bus being clamped to ground potential at the voltage signal frequency.

2. The power line communication system defined in claim 1, wherein said inductive means includes a magnetic core linked with said tie conductor such as to constitute a winding thereon.

3. The power line communication system defined in claim 2, wherein said core embraces said tie conductor such as to constitute a one-turn winding thereof.

4. The power line communication system defined in claim 1, wherein said inductive means comprises a signal coupling transformer having a core linked with said tie conductor and a winding wound on said core.

5. The power line communication system defined in claim 4, which further includes a capacitive coupler exhibiting a high impedance at the power frequency, one of said transmitter and receiver connected with said core winding, said capacitive coupler connecting the other of said transmitter and receiver across the ground and neutral conductors of said one branch circuit at a location downstream from the load center.

6. The power line communication system defined in claim 5, wherein said transmitter is connected with said transformer core winding and said capacitive coupler connects said receiver across the ground and neutral conductors of said one branch circuit.

7. The power line communication system defined in claim 5, wherein said communication link includes plural branch circuits, each having a ground conductor commonly terminated in electrical connection with said ground bus, said system further including plural receivers, and plural capacitive couplers respectively individually connecting said receivers across the ground and neutral conductors of said plural branch circuits.

8. The power line communication system defined in claim 7, wherein said receivers have a high input impedance and said capacitive couplers exhibit a relatively low impedance at the signal frequency.

9. The power line communication system defined in claim 4, wherein said signal coupling transformer further includes a capacitor connected across said core winding to create with said core winding a parallel resonant circuit at the signal frequency.

10. The power line communication system defined in claim 9, which further includes a capacitive signal coupler connecting at least one of said transmitter and receiver across the ground and neutral conductors of said branch circuit communication link, said capacitive couplers exhibiting a high impedance at the power frequency.

11. The power line communication system defined in claims 9 or 10, wherein said signal coupling transformer further includes a resistor connected in parallel with said capacitor to provide said parallel resonant circuit with a desired Q.

12. The power line communication system defined in claims 9 or 10, wherein said signal coupling transformer further includes a resistor connected in parallel with said capacitor to provide said parallel resonant circuit with a desired Q, and a voltage clamping element connected across said parallel resonant circuit to suppress spurious shock excitation thereof.

13. The power line communication system defined in claim 10, wherein said communication link includes plural branch circuits, each including a ground conductor commonly terminated in electrical connection with said ground bus, said system further including plural transmitters and receivers individually connected by respective ones of said capacitive signal couplers across the ground and neutral conductors of said plural branch circuits.

14. The power line communication system defined in claim 13, wherein said receivers have a high imput impedance and at least those of said capacitive signal couplers connecting said receivers across the branch circuit ground and neutral conductors exhibiting a low impedance at the signal frequency.

15. The power line communication system defined in claims 9, 10, 13 or 14, wherein at least one of said transmitter and receiver is a transceiver.

* * * * *